United States Patent
Alon et al.

(10) Patent No.: US 9,569,785 B2
(45) Date of Patent: Feb. 14, 2017

(54) METHOD FOR ADJUSTING CONTENT OF A WEBPAGE IN REAL TIME BASED ON USERS ONLINE BEHAVIOR AND PROFILE

(71) Applicant: Marketo, Inc., San Mateo, CA (US)

(72) Inventors: Mickey Alon, Herzlia (IL); Mike Telem, Giv'at Shmuel (IL)

(73) Assignee: Marketo, Inc., San Mateo, CA (US)

( * ) Notice: Subject to any disclaimer, the term of this patent is extended or adjusted under 35 U.S.C. 154(b) by 90 days.

(21) Appl. No.: 14/086,200

(22) Filed: Nov. 21, 2013

(65) Prior Publication Data

US 2014/0143655 A1 May 22, 2014

Related U.S. Application Data

(60) Provisional application No. 61/728,865, filed on Nov. 21, 2012.

(51) Int. Cl.
G06F 17/00 (2006.01)
G06Q 30/02 (2012.01)
G06F 17/22 (2006.01)

(52) U.S. Cl.
CPC ....... *G06Q 30/0201* (2013.01); *G06F 17/2247* (2013.01); *G06Q 30/0202* (2013.01)

(58) Field of Classification Search
CPC ................ G06F 17/2247; G06F 17/22–17/248
See application file for complete search history.

(56) References Cited

U.S. PATENT DOCUMENTS

2005/0097008 A1* 5/2005 Ehring et al. ............. 705/26
2009/0112807 A1* 4/2009 Bahn ............. G06F 17/30867

* cited by examiner

*Primary Examiner* — Keith Bloomquist
(74) *Attorney, Agent, or Firm* — Mahamedi IP Law LLP (57) ABSTRACT

The present invention discloses a method for providing adjusted content in a webpage in a website. The method comprising the steps of: tracking visitors that are visiting the monitored website to identify one or more parameters relating to visitor profile, navigation behavior and/or content usage, analyzing the parameters that were identified selecting at least one statistical algorithm, which is relevant for the type of knowledge that was identified, real time monitoring visitor behavior including: profile, navigation path and/or content usage of each visitor in the monitored website, real time analyzing the monitored behavior according to the relevant statistical algorithm and real time replacing or adding content in the webpage to be presented for a specified visitor according analysis results in a specified part of the webpage.

19 Claims, 9 Drawing Sheets

METHOD FOR ADJUSTING CONTENT OF A WEBPAGE IN REAL TIME BASED ON USERS ONLINE BEHAVIOR AND PROFILE

TECHNICAL FIELD

The present invention relates to the field of content of webpages, and more particularly, to adjusting content of webpages to interest of viewers according to various parameters and a marketer's goals.

BACKGROUND ART

Current solutions for personalizing business websites content according to visitor profiles are implemented for business websites, which are targeted for consumers. However, the personalization of business websites content is enabled only for identified visitors that are adapting the shopping content and sale's promotion, according to known preferences and activity of the visitor.

Known in the art Real-time website personalization is using simple click stream data that exist on the browser level or e-commerce product catalog which is small scale data. In B2B the challenge is to be able to map relevant content to visitors based on business relevancy and stage in the sales cycle, the known solutions enable only "rule-based" personalization only for known visitors. It is the object of the present invention to detect anonymous visitors and engage content utilizing predictive analytics in real-time using big data processing.

SUMMARY OF INVENTION

The present invention provides a method for providing adjusted content in a webpage in a website. The method comprising the steps of: tracking visitors that are visiting the monitored website to identify one or more parameters relating to visitor profile, navigation behavior and/or content usage, analyzing the parameters that were identified selecting at least one statistical algorithm, which is relevant for the type of knowledge that was identified, real time monitoring visitor behavior including: profile, navigation path and/or content usage of each visitor in the monitored website, analyzing the monitored behavior in real time according to the relevant statistical algorithm and replacing or adding in real time, content in the webpage to be presented for a specified visitor according analysis results in a specified part of the webpage.

According to some embodiments of the present invention the statistical algorithm is a clustering algorithm for classifying visitor into groups based in identification or navigation path parameters.

According to some embodiments of the present invention the replacing or adding content is based on content items clustering algorithm which enable classifying content into groups by analyzing plurality of attributes of the visitors that consumed the content.

According to some embodiments of the present invention the statistical algorithm is a probability algorithm for creating probability based in identification of statistical association/correlation between sequence of visitors navigation and content selections.

According to some embodiments of the present invention the statistical algorithm is a neighborhood algorithm by applying collaborative filtering for classifying visitors into neighborhood groups based on content usage parameters.

According to some embodiments of the present invention the method further comprises the step of retrieving rules and the adjusted content from data storage for a specified classification.

According to some embodiments of the present invention the methods further comprises the step of, parsing the webpage in real time to specify part of the webpage where the content will be presented.

According to some embodiments of the present invention the method further comprises the step of analyzing actions in relation to their occurrence time.

According to some embodiments of the present invention the method further comprises the step of generating visitor anonymous profile based on analyzed behavior and group classification according visitor's attributes, such as Geo location, industry and organization association.

According to some embodiments of the present invention the method further comprises the step of storing the analysis results in unique caching repository for enabling real time statistics and data retrieval for engagement, wherein the analysis results include one of the following: Visitor groups clustering, Asset groups clustering, nearest neighbor groups or probability tree.

According to some embodiments of the invention, a method for providing adjusted content in a webpage in a website is provided herein. The method comprising the steps of: (i) monitoring traffic in a website, (ii) tracking visitors that are visiting the monitored website to identify one or more parameters relating to visitor's profile and behavior; (iii) clustering visitors by generation of groups using analysis of the statistics of the parameters that were identified; (iv) clustering assets by generation of groups using analysis of the statistics of visitors that consumed them; (v) monitoring behavior of each visitor in the monitored website; (vi) analyzing the monitored behavior; (vii) assigning each visitor to a cluster of similar visitors based on unanalyzed behavior and group classification; (viii) retrieving rules and the adjusted content from a data storage for a specified classification; and (ix) replacing or adding content in a specified part of the webpage to be presented for a specified visitor according to retrieved predefined rules and the statistics gathered.

These, additional, and/or other aspects and/or advantages of the present invention are: set forth in the detailed description which follows; possibly inferable from the detailed description; and/or learnable by practice of the present invention.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "big data" as used herein in this application, is defined as a collection of data sets that is so large and complex that it is not possible to handle with database management tools. As per Gartner, "Big Data are high-volume, high-velocity, and/or high-variety information assets that require new forms of processing to enable enhanced decision making, insight discovery and process optimization."

The term "anonymous profile" as used herein in this application, is defined as a viewer of a website that didn't identify by login process to the website.

The term "proprietary heuristics" as used herein in this application, is defined as experienced techniques that were developed by the applicant and are used when an exhaustive search is impractical.

The present invention aims for statistically analyzing the behavior of anonymous visitors that are navigating in an Internet website based on their: content usage (selecting specific content to view or downloading content from the website navigational behavior (visits, clicks, selection URL), association to an organization, social network, history (number of visits), geo location, or industry. It is suggested, according to the present invention, to enable real time auto-engagement process of updating content of the Internet website for visitors based on their analyzed behavior, based on their related organization, by providing them personalized messages that are relevant to their associated industry, their geographic location or their behavior, as identified throughout their navigation (i.e. behavior) in the internet website.

The auto-engagement process provides a marketing strategy which known as "prospect nurturing". This marketing strategy enables delivery of personalized content to visitors and it is used today mostly by email communication, only for identified clients (i.e. visitors). The present invention allows real-time prospect nurturing for anonymous clients throughout their navigation in the website. It may provide anonymous potential clients with marketing information to bring them into sales' cycle.

In other words, the present invention allows a real-time auto-engagement process based on detection and behavior statistical analysis of anonymous visitors (i.e. potential clients). Anonymous visitors are normally at pre-lead state and nurturing them is called 'seed nurturing'.

In 'seed nurturing' the classification of visitors is performed by heuristics to find conversion patterns behavior (i.e. conversion from an anonymous visitor to a business lead) that are common between anonymous visitors. Conversion patterns are the pattern behavior of anonymous visitors that are becoming business leads after being exposed to a marketing material. For example, on his second visit to a website anonymous visitor sees a link to a white paper the visitor clicks on it and reads it, and fills out a form requesting more details thus becomes a business lead. Identification of such conversion patterns may be used for verifying or updating the predefined rules in the engagement rules of the web content adjustments.

Figure 1:
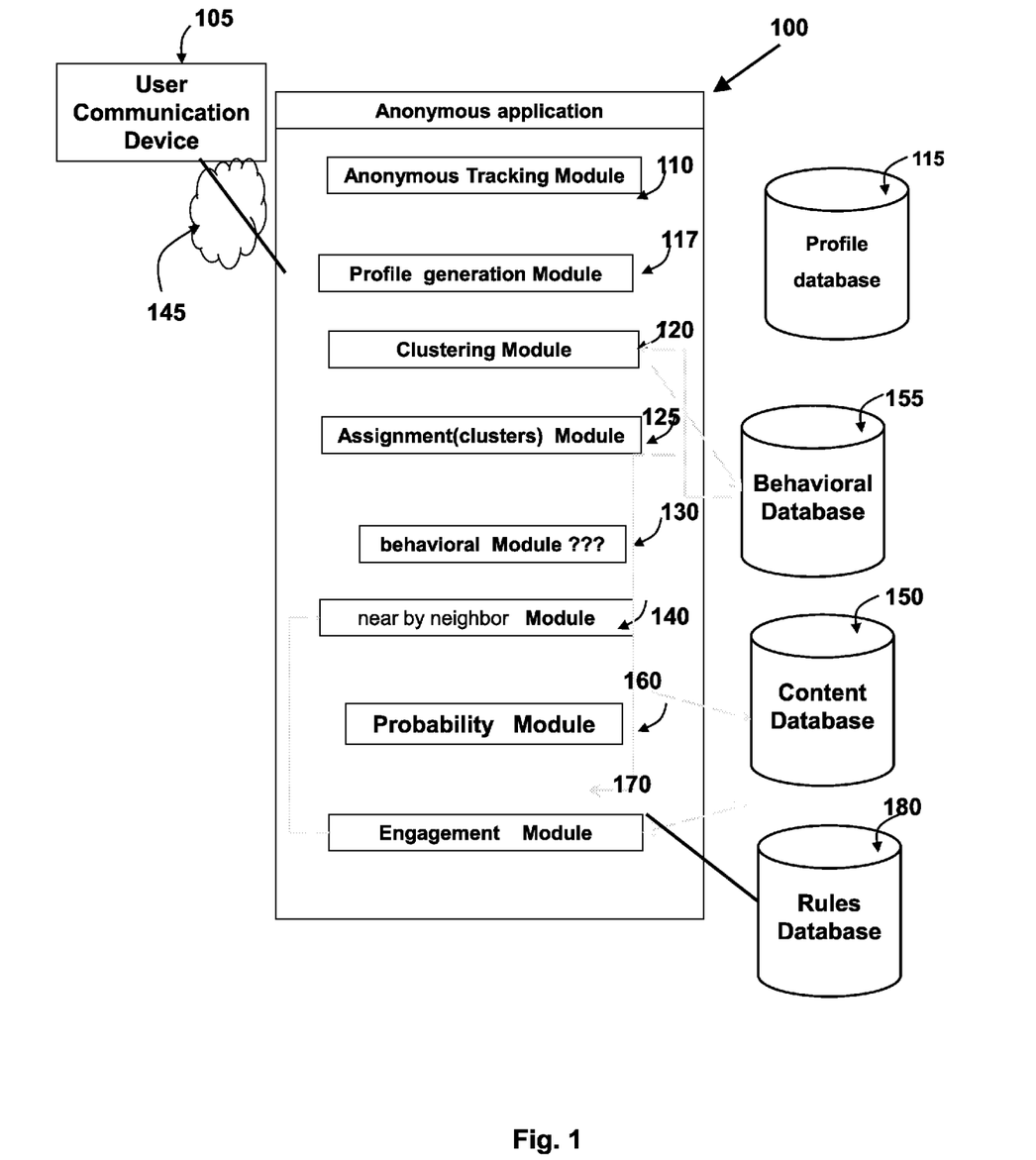
FIG. 1 is a block diagram of a system for adjusting content of webpages, according to some embodiments of the invention.

FIG. 1 is a block diagram of a system for adjusting content of webpages, according to some embodiments of the invention.

According to some embodiments of the present invention, web content adjusting application 100 aims to improve response of websites to traffic of viewers (i.e. visitors) that is coming via visitor communication devices 105. Improving the response of the websites is performed by adjusting, in real-time, the content of the webpage to a viewer, according to the viewer's behavior (i.e. navigation path) and other parameters. One of the parameters, which are taken into account, may be geographic origin of the viewer.

For example, a viewer from Zagreb that is navigating the same webpage in a monitored website as a viewer from Reykjavik, may see different content due to their different origin. As a result of process and analysis of the application for adjusting content of webpages 100 the viewer from Zagreb may see in a non-limiting example, content regarding conferences in Zagreb and the viewer from Reykjavik may see content regarding salmon and trout fish. Such data content adjustment enables prospect nurturing, throughout the navigation session of an anonymous visitor (i.e. viewer).

According to some embodiments of the present invention, the web content adjusting application 100 may activate a tracking module 110 to generate a profile of an anonymous visitor (i.e. viewer) by various parameters and store it in a profile database 115 as will be described in detail in FIG. 2.

According to some embodiments of the present invention, a clustering module 120 may monitor viewers by various parameters and cluster them into groups, as will be described in detail in FIG. 3.

The process of clustering viewers into groups involves analysis of big data. In order to save time and computer resources, proprietary heuristics are being implemented. These proprietary heuristics are taking into account intersections of profiles of visitors and industries. For example, a profile of a viewer that was clustered into a group of venture capital industry may view content related to currency rate and stocks.

According to some embodiments of the present invention, an anonymous profile generating module 117 may handle data on each viewer and assign each viewer to a group, as will be described in detail in FIG. 4.

According to some embodiments of the present invention, an assignment module 125 may handle a profile of a visitor and assign it to a predefined group, as will be described in detail in FIG. 5.

According to some embodiments of the present invention, a behavior module 130 may analyze behavior pattern of the visitor, as will be described in detail in FIG. 6.

According to some embodiments of the present invention, a nearest neighbor module 140 may analyze behavior pattern of visitor's content usage, as will be described in detail in FIG. 7.

According to some embodiments of the present invention, a probability module 160 may analyze behavior pattern of correlation between visitors navigation content usage activates, as will be described in detail in FIG. 8.

According to some embodiments of the present invention, an engagement module 170 may operate content adjusting of a webpage in a website. The content may be retrieved from content database 150 according to: (i) specified rules which are retrieved from rules database 180; and (ii) received profile of a visitor.

Figure 2:
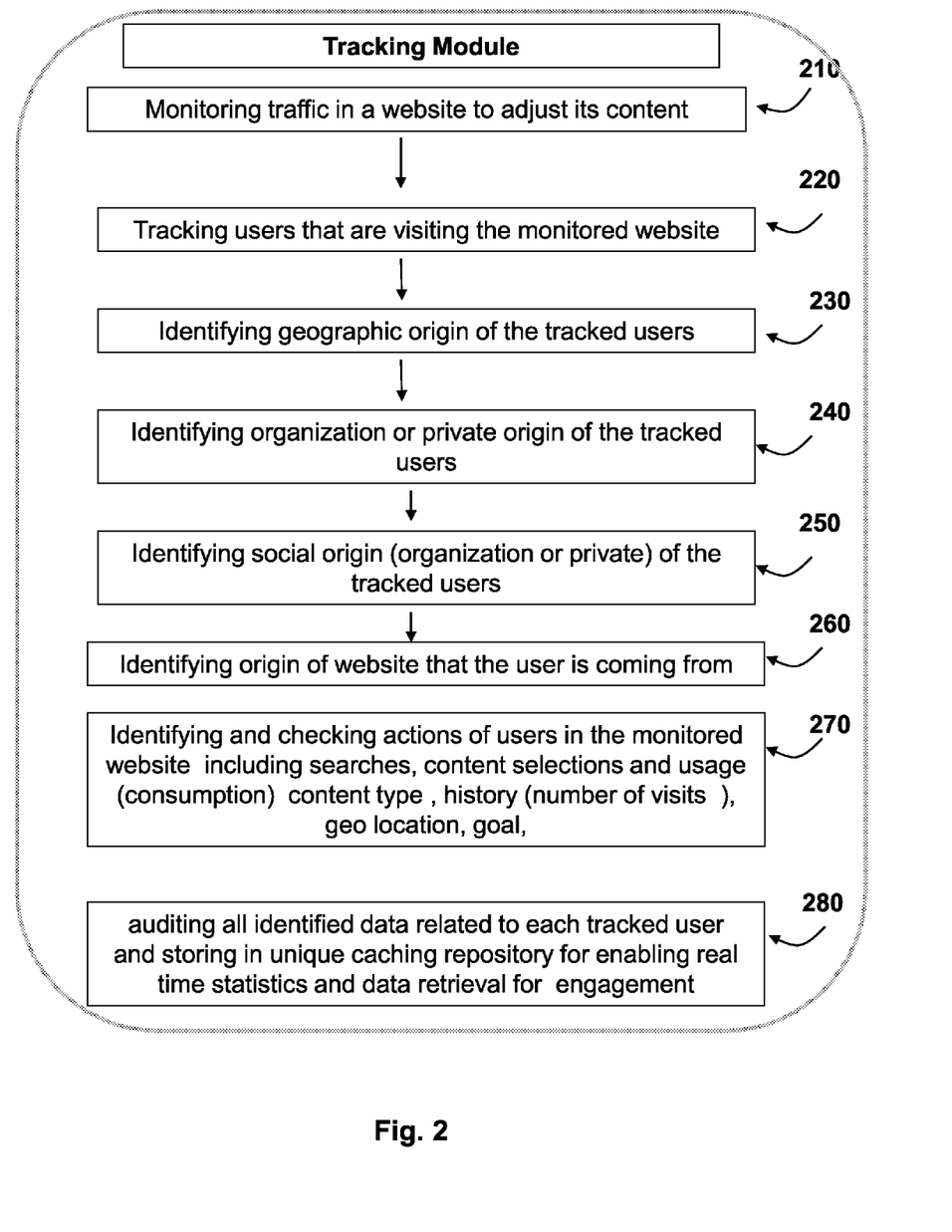
FIG. 2 is a flowchart illustrating a method of tracking visitors, according to some embodiments of the invention.

FIG. 2 is a flowchart illustrating a method of tracking visitors, according to some embodiments of the invention.

According to some embodiments of the present invention, tracking module 110 in FIG. 1 may monitor traffic in a specified website (stage 210).

According to some embodiments of the present invention, visitor communication device 105 in FIG. 1 of a viewer (i.e. visitor) that is navigating in the monitored website may be tracked to identify various parameters (stage 220) such as: (i) identifying geographic origin of the tracked viewer (stage 230); For example, a viewer coming from London and another viewer that is coming from New Delhi. (ii) identifying organization or private origin of the tracked viewer (stage 240); In other words, checking if the viewer is navigating from a workplace or from a residential place (iii) identifying social origin, of the tracked viewer, meaning checking if the visitor was referred from a social website such as Facebook™ (stage 250); (iv) identifying origin of website that the visitor is coming from (stage 260) For example, search engines like Google and Bing; and (v) identifying and checking actions of visitors (i.e. viewers) in the monitored website (stage 270). For example, search actions by keywords in the monitored website or navigating in a specific section of the website such as careers and openings, content selections and usage (consumption), content type, history (number of visits), geo location and goals.

According to some embodiments of the present invention, after performing various identifications, as mentioned above, the tracking module 110 in FIG. 1 may audit all identified data related to each tracked visitor and store it in a unique caching repository for enabling real time statistics and data retrieval future engagements (stage 280).

Figure 3:
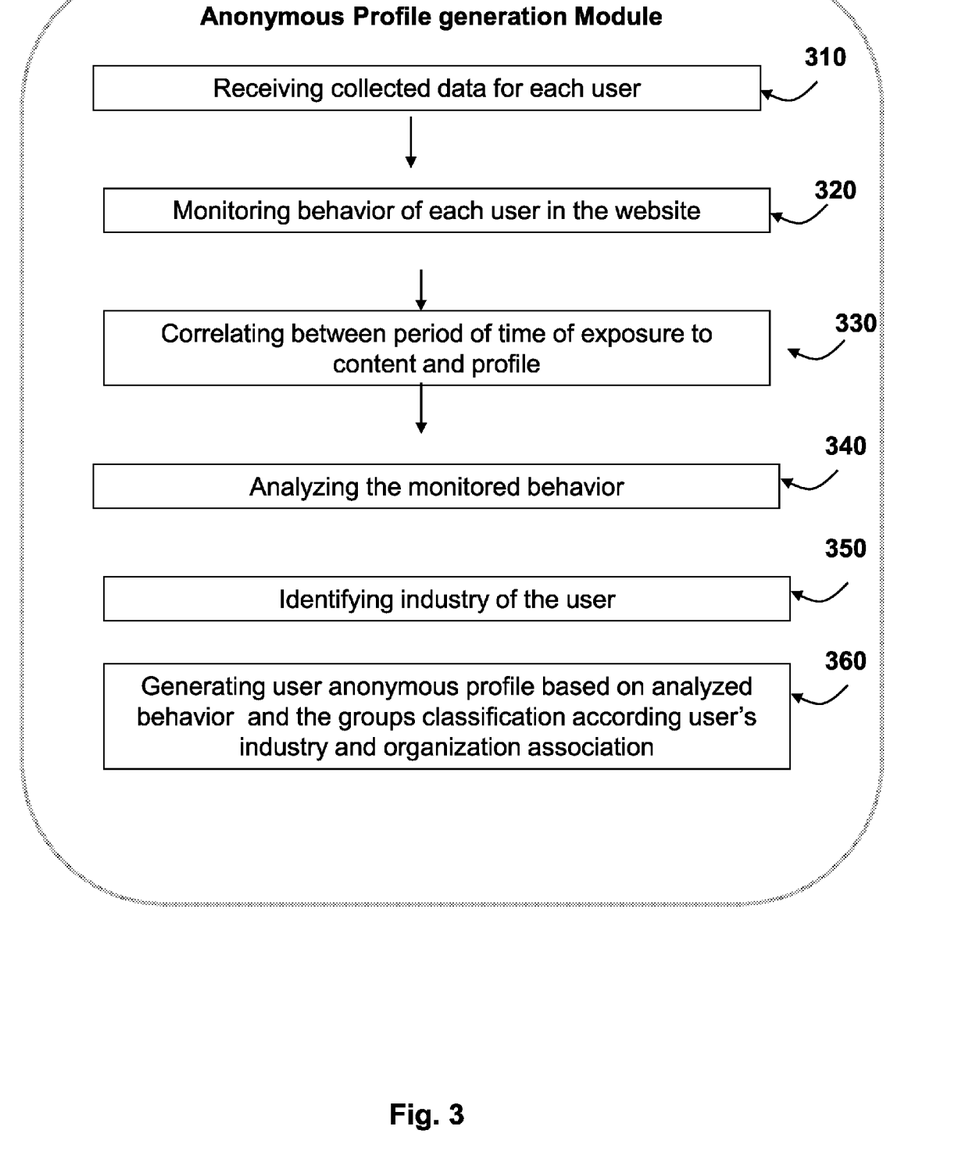
FIG. 3 is a flowchart illustrating a method of generating anonymous profile of a visitor, according to some embodiments of the invention.

FIG. 3 is a flowchart illustrating a method of generating anonymous profile of a visitor, according to some embodiments of the invention.

According to some embodiments of the present invention, anonymous profile generation module 125 in FIG. 1 may receive data for each visitor (stage 310) that was collected from tracking module 110. Next, behavior of each visitor in the website may be monitored (stage 320).

According to some embodiments of the present invention, period of time of exposure to webpages in the website may be checked and correlated with content and profile of visitors (stage 330).

According to some embodiments of the present invention, the monitored behavior may be analyzed (stage 340) and industry of the visitor may be identified (stage 350).

According to some embodiments of the present invention, the generation of visitor anonymous profile (step 360) is based on analyzed behavior and the groups classification according visitor's attributes such as Geo location, industry and organization association.

Figure 4:
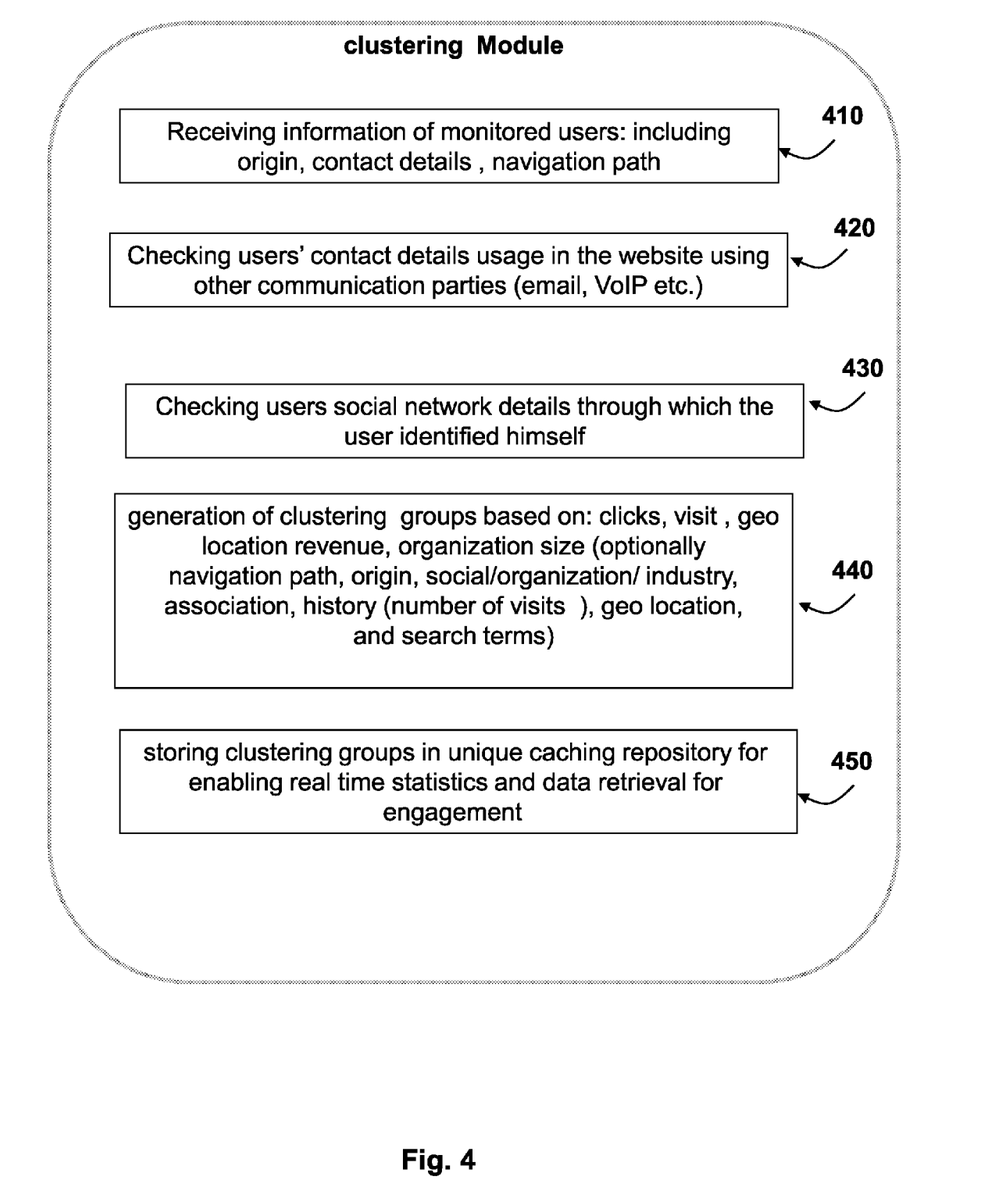
FIG. 4 is a flowchart illustrating a method of clustering algorithm, according to some embodiments of the invention.

FIG. 4 is a flowchart illustrating a method of clustering algorithm, according to some embodiments of the invention.

According to some embodiments of the present invention, clustering module 120 in FIG. 1 may monitor visitors that are navigating in a specified website (stage 410). During the monitoring, some or all of the following information of monitored visitors is collected: origin details, contact details, navigation path (stage 410).

According to some embodiments of the present invention, clustering module 120 is checking usage of visitor's contact details in the website via the website and other communication parties such as email, etc. (stage 420). The clustering module may check feedback and action of the visitors that are navigating in the monitored website such as registering to the monitored website (including its services) or initiation of contact via the website by the visitor such as, sending an email or calling representatives of the monitored website. Such information can be used to indicate on successful matching between the visitors' profile and behavior and the presented content adjusted by the application 100 in FIG. 1.

According to some embodiments of the present invention, clustering module 120 in FIG. 1 may check visitors' login to the website via a social network website such as Facebook™ (stage 430).

Finally, clustering module 120 in FIG. 1 may cluster visitors by generation of groups using analysis of statistics of the results of all checks and identifications as mentioned above (step 440): clicks, visit, geo location revenue, organization size (optionally navigation path, origin, social/organization/industry, association, history (number of visits), geo location, search terms, visitor's behavior including navigation path, selections, keyword used in information searches, and visitor feedback. The classification process may find correlation between the different parameters which characterize the visitor profile and its behavior for identifying groups of visitors which their characteristics indicate of at least one common interest or common behavior, such that the same content may be targeted to most visitors of the group.

The generation of groups may be based on the analyzed behavior using proprietary heuristics that where collected regarding visitor's behavior as described above.

The proprietary heuristics techniques are used to analyze the visitor's grouping clustering data for reducing the scale of the big data problem by cross analyzing the group clustering data according to industry or organization association of the visitor. In other words, instead of processing a large amount of data in case of a matching of a visitor to a group it may require to process only reduced amount of data records of group clustering data, using the heuristics related to the industry or organization association which may reduce usage of resources such as computer resources and time in the process.

To provide quick response, i.e. in less than 50 milliseconds, the present application clusters big data based on timeline of the navigation process, public digital organization and/or social data and actual visit timestamp. Indexing the data based on those parameters makes it possible to track trends, and retrieve relevant data for personalization of "anonymous visitors" while maintaining of a sustainable data model.

According to some embodiments of the present invention, clustering module may store clustered groups in unique caching repository for enabling real time statistics and data retrieval for engagement.

The unique caching repository utilizes in-memory optimized matrix model, which allow real-time interactions on big data. This model is optimized for the usage of each statistical algorithm by implementing one of the following: high density matrix which filters out the low relevancy recommendation mapping, aggregated clustering data (hence eliminating duplicate content items records) or caching next best offer based on visitor timeline to enable real-time retrieval while the visitor navigates through the website and/or filtering out, less relevant or deprecated/older visitors.

Figure 5:
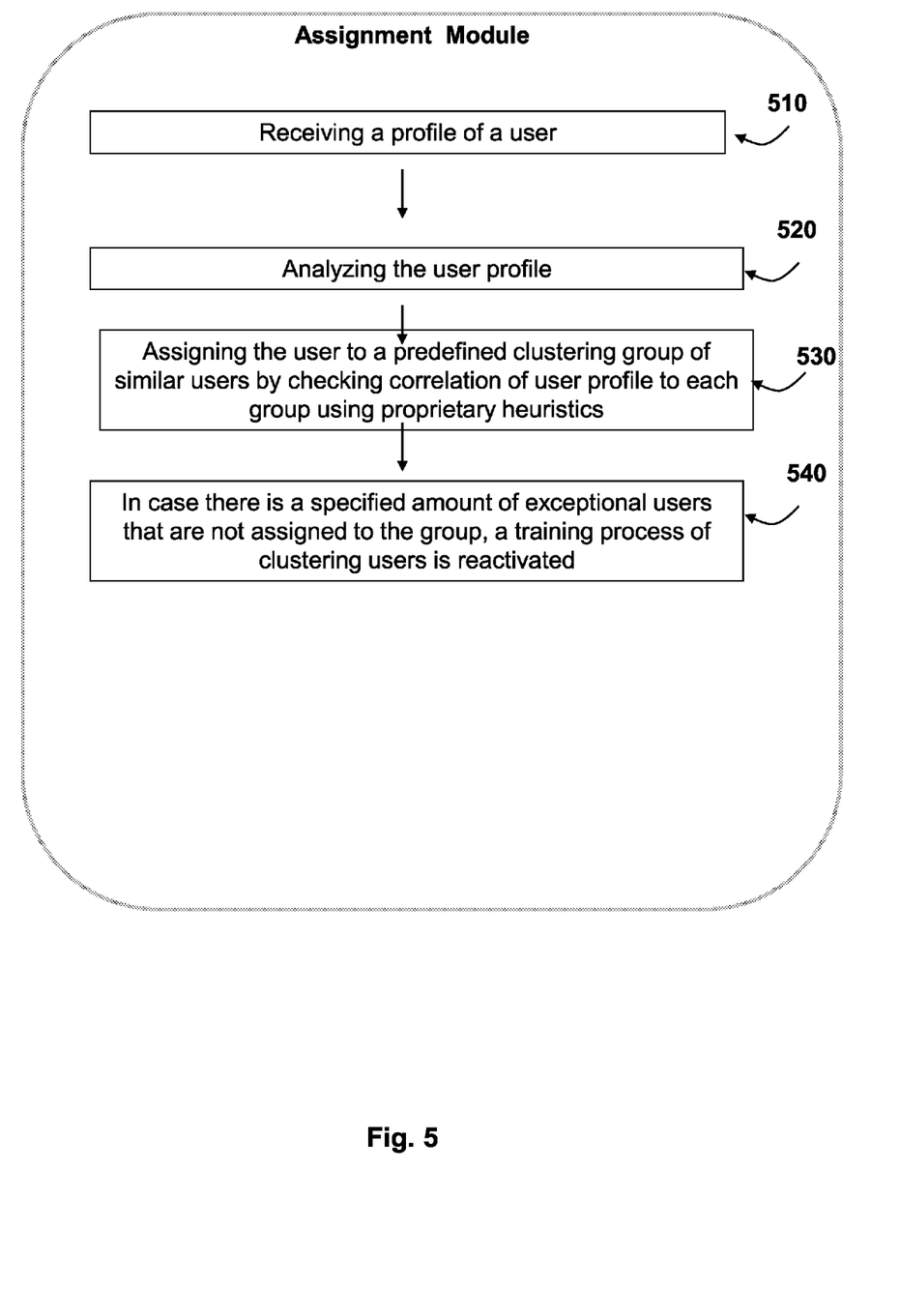
FIG. 5 is a flowchart illustrating a method of assigning visitors to clustered groups, according to some embodiments of the invention.

FIG. 5 is a flowchart illustrating a method of assigning visitors to clustered groups, according to some embodiments of the invention.

According to some embodiments of the present invention, assignment module 125 may receive a profile of a visitor (stage 510) and analyze it (stage 520). Next, assignment module 125 may assign the visitor to a predefined group using the profile of the visitor to calculate correlation (stage 530). The present application suggests classification process which utilizes correlation of time and IP and name of an organization to identify visitors and their clustered groups.

Finally, in case there is a specified amount of exceptional visitors that are not assigned to the group, a training process of clustering of profiles of visitors is reactivated (stage 540). The visitors' profiles and behavior may change over time; therefore accordingly the group clustering has to be adapted to reflect the change. The present invention provides dynamic model by continuously analyzing statistically visitors' profile and behavior in comparison to the group clustering definition and identifying when statistically the amount of exceptional visitors has exceeded a predefined level. In this case, the training process is reactivated for a predefined time period for redefining the group clustering.

Figure 6:
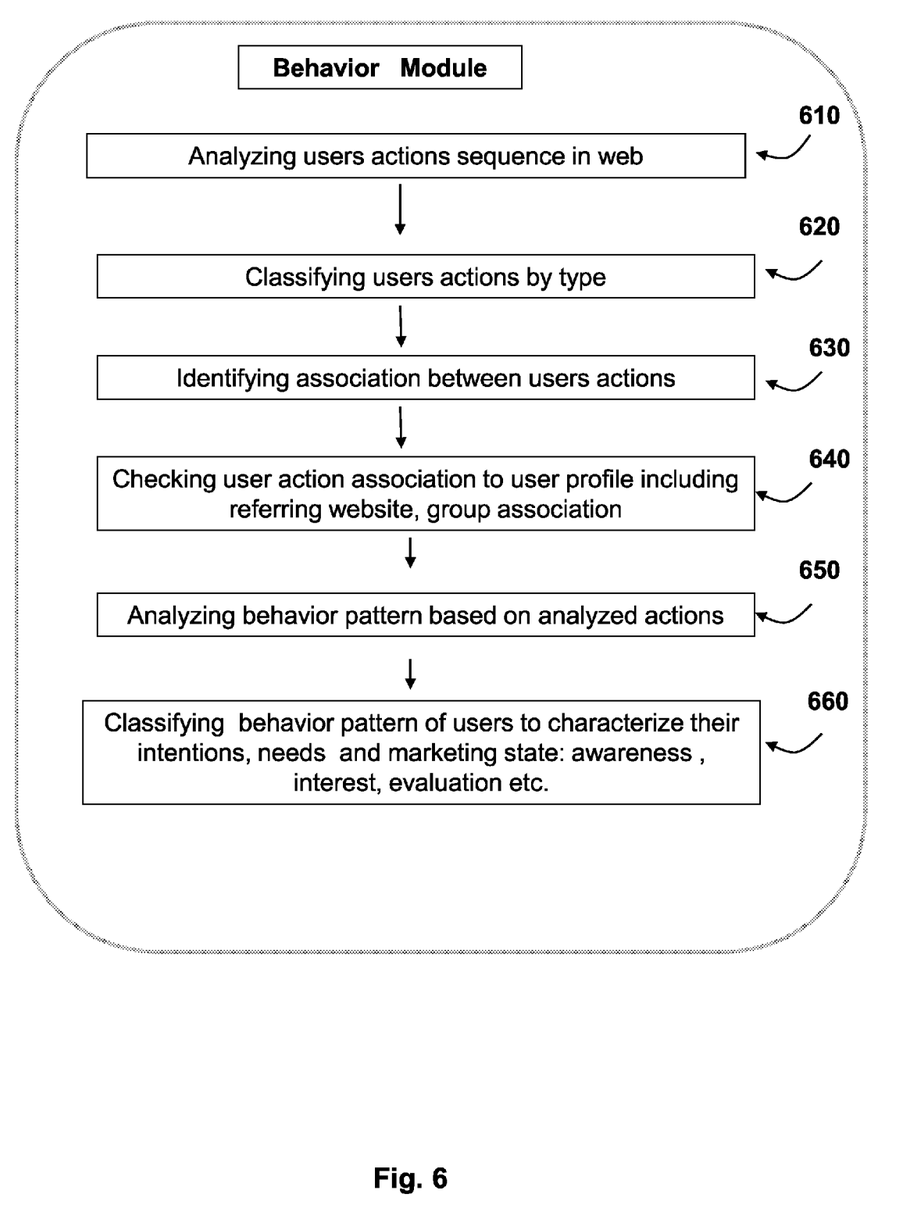
FIG. 6 is a flowchart illustrating a method of analyzing behavior pattern, according to some embodiments of the invention.

FIG. 6 is a flowchart illustrating a method of analyzing behavior pattern, according to some embodiments of the invention. This module analyzes visitor actions sequence in web for classifying visitor's actions by type and identifying association between visitor's actions (step 610). Optionally the modules checks, visitor action in association to visitor profile including referring website, group association (step 620). Based on analyzed action sequence is identified behavior pattern (step 650), the identified behavior pattern is classified to characterize visitor intentions, needs and marketing state/status in a sale, such as: awareness, interest, evaluation etc. (step 660). At the last step the module may assign each visitor to a group of similar visitors based on the analyzed behavior pattern (step 670).

Optionally visitor profiles and pattern behavior are analyzed and associated with data in the CRM database.

Figure 7A:
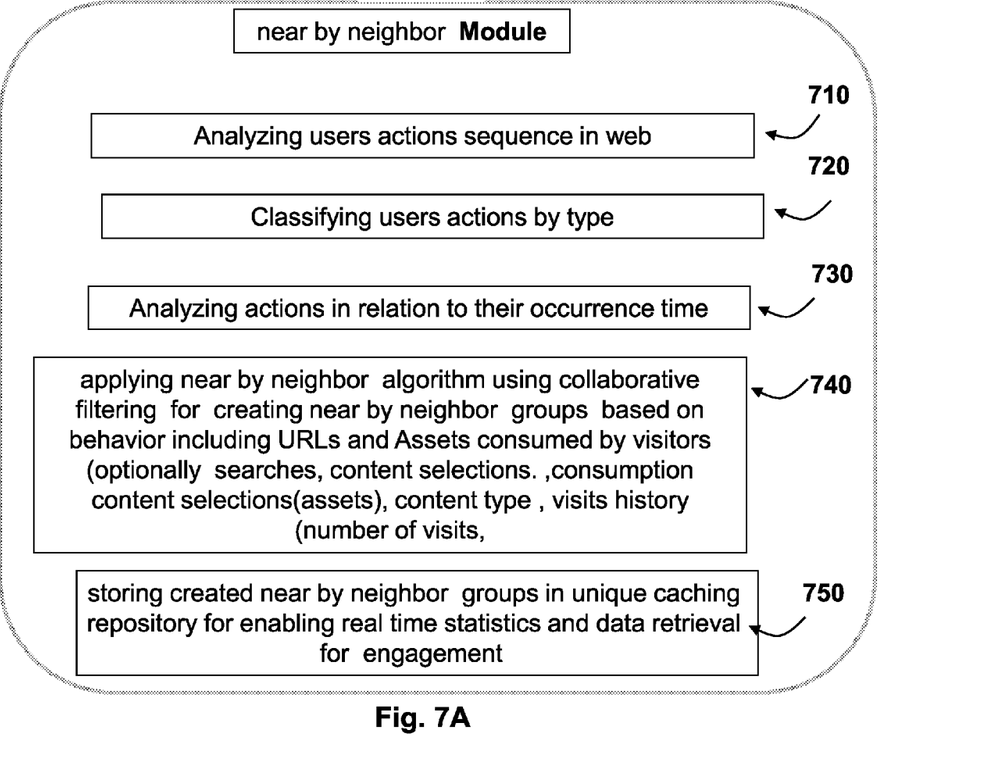
FIG. 7A is a flowchart illustrating a method of near by neighbor algorithm, according to some embodiments of the invention.

FIG. 7A is a flowchart illustrating a method of nearest neighbor algorithm, according to some embodiments of the invention. The nearest neighbor algorithm include the following steps: analyzing visitors actions sequence in web such as sequence of content selection and usage (step 710), classifying visitors actions by type to identify content consumption action (step 720), analyzing actions in relation to their occurrence time (step 730), for example if they occurred in the first visit of the visitor or the second one and finally applying nearest neighbor algorithm using collaborative filtering (step 740) for creating nearby neighbor groups based on behavior including URLs and content items (Asset) consumed by visitors. Optionally the creation of neighbor groups, is further depended on search terms, content selections, content type, visits history (number of visits). The created nearby neighbor groups are stored in unique caching repository for enabling real time statistics and data retrieval for engagement (step 750).

Figure 7B:
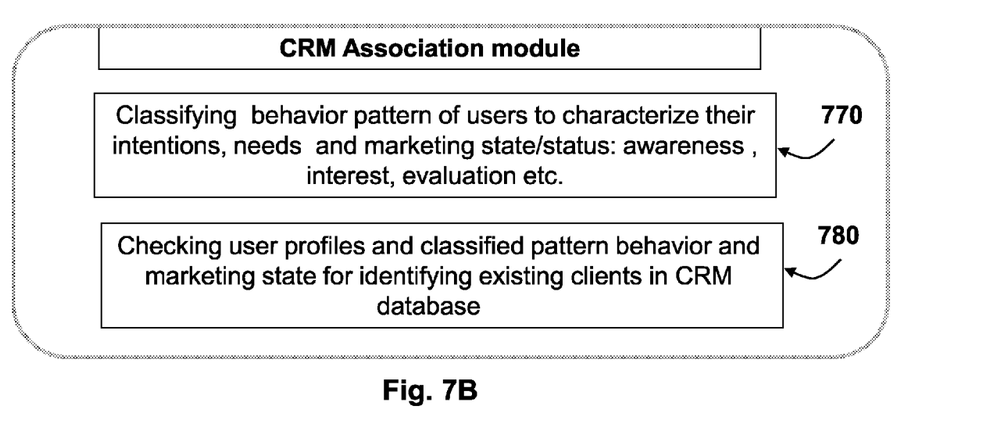
FIG. 7B is a flowchart illustrating a method of CRM Association module, according to some embodiments of the invention.

FIG. 7B is a flowchart illustrating a method of CRM Association module, according to some embodiments of the invention. The CRM Association module applies one of the following steps: classifying behavior pattern of visitors to characterize their intentions, needs and marketing state/ status within a sale scenario (step 770), such as awareness, interest, evaluation etc. Based on visitor profiles, classified pattern behavior and marketing state are identified returning clients in CRM database (step 780).

Figure 8:
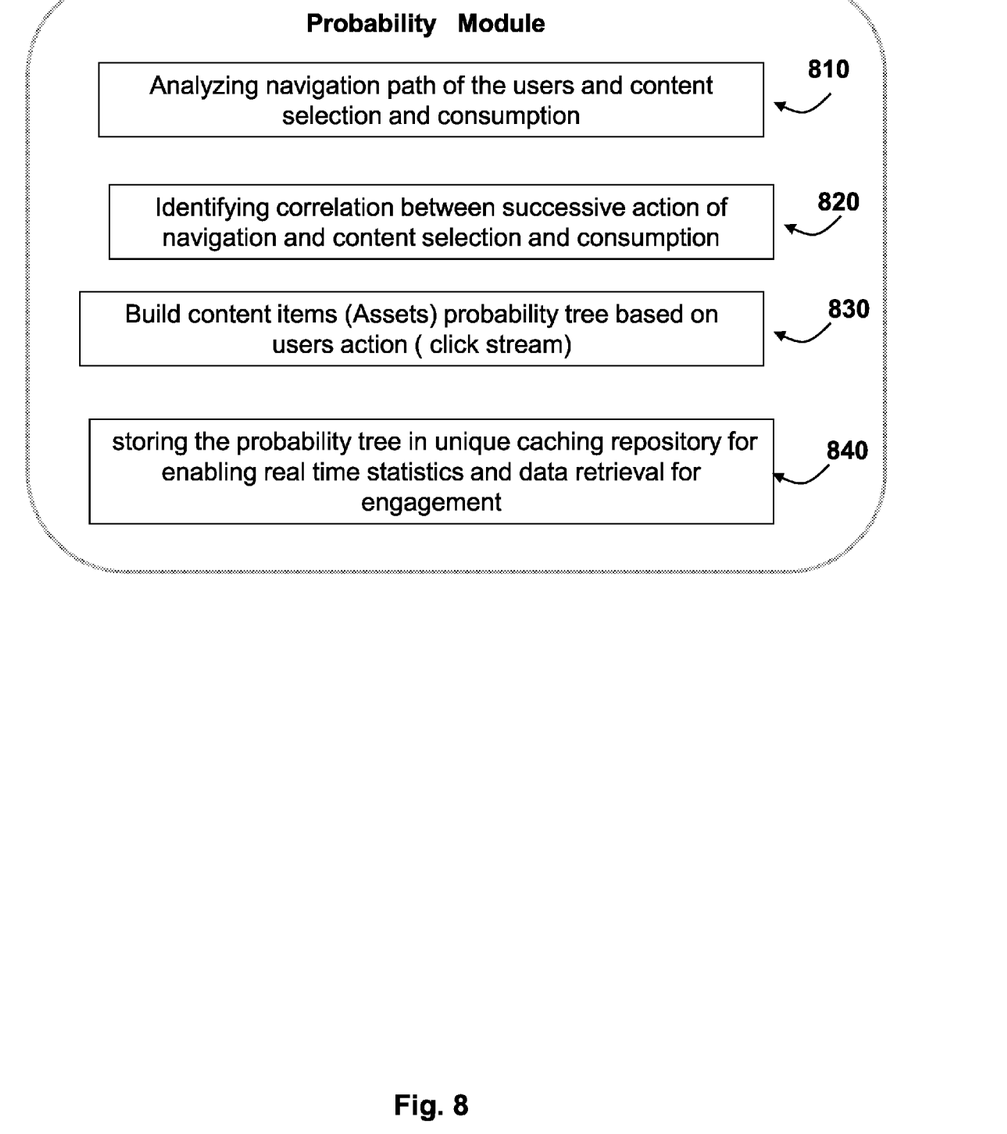
FIG. 8 is a flowchart illustrating a method of probability algorithm, according to some embodiments of the invention.

FIG. 8 is a flowchart illustrating a method of probability algorithm, according to some embodiments of the invention. The probability module applies at least one of the following steps: analyzing navigation path of the visitors and content selection and consumption (step 810), identifying statistics correlation or association between successive action of navigation and content selection and consumption (step 820), build content items (Assets) probability tree based on visitors action (click stream) or identified correlation (step 830) and storing the probability tree in unique caching repository for enabling real time statistics and data retrieval for engagement (step 840).

Figure 9:
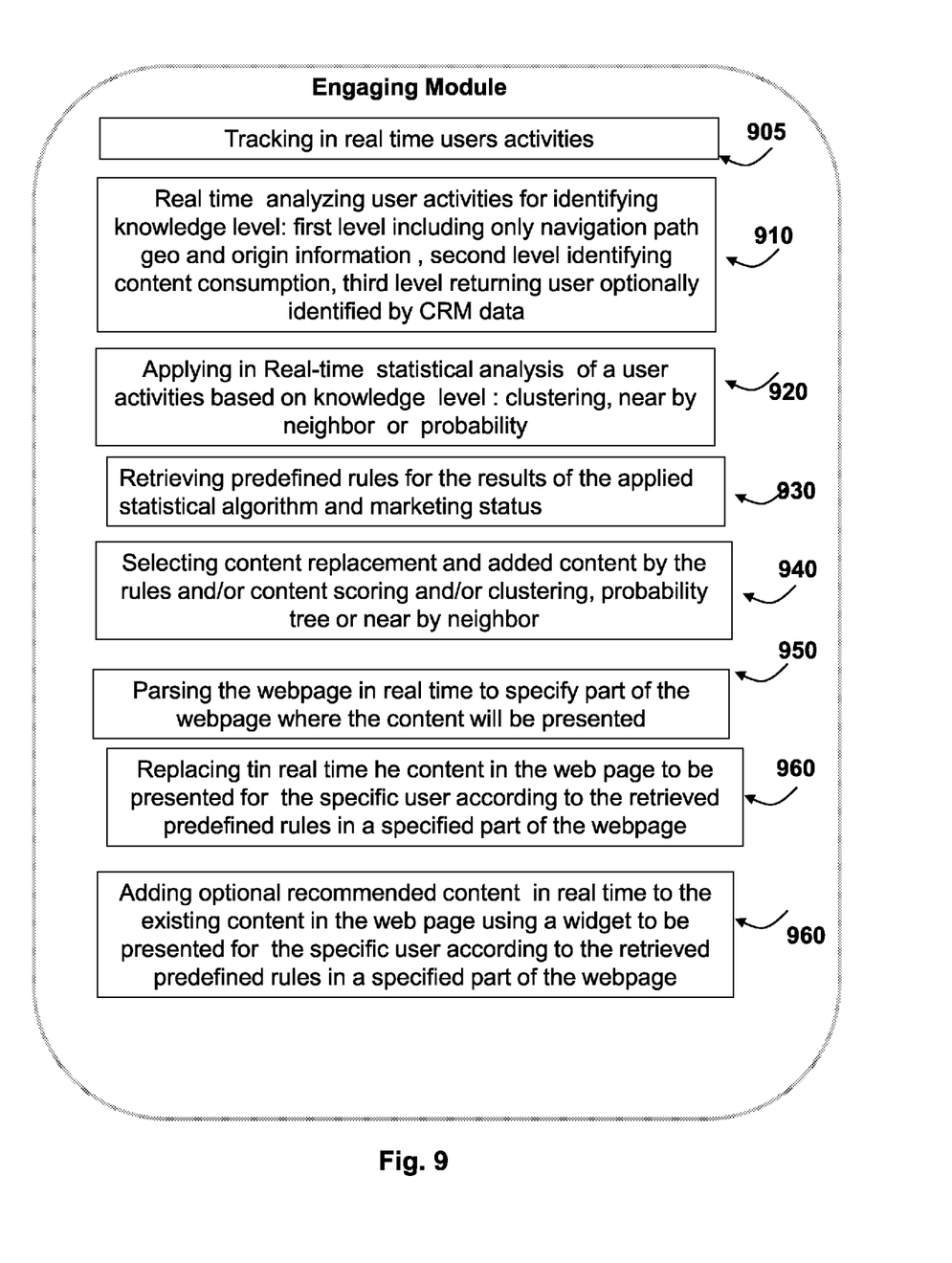
FIG. 9 is a flowchart illustrating a method of engaging module, according to some embodiments of the invention.

FIG. 9 is a flowchart illustrating a method of providing content to a visitor, according to some embodiments of the invention.

According to some embodiments of the present invention, engaging module 140 in FIG. 1 may perform at least one of following steps: Tracking in real time visitors activities (step 905) and analyzing in real time visitor activities for identifying type of identified parameters (knowledge level): first level including only navigation path, geo location and/or origin information, second level including identifying content usage (consumption), third level in case the visitor is a returning visitor identified by CRM data (step 910). At the next step the modules applies in Real-time statistical analysis of a visitor activities based on knowledge level using clustering, nearest neighbor or probability algorithm (step 920).

Optionally predefined rules are retrieved from the rules database 155 to be applied on the results of the statistical algorithm and/or marketing status (steps 930). At the next stages the module selects content for replacement and/or recommended content to be added to the website according to one of the following options: content scoring and/or group clustering, probability tree or nearest neighbor grouping (step 940). Optionally content is selected by using the retrieved the rules. For replacing or adding the content the modules parses the webpage in real time to specify part of the webpage where the content will be presented (step 950). Once identifying the location of the content to be replaced in the website, the module replaces in real time the content in the web page to be presented for the specific visitor according to the selected content in a specified part of the webpage (step 960) and/or adding optional recommended content in real time to the existing content in the web page using a widget to be presented for the specific visitor according to selected content in a specified part of the webpage (step 970)

These predefined rules, represent the owner prospect nurturing strategic schemes, which define what content should be displayed to each group of visitors based on their navigation behavior, behavior pattern or organization behavior pattern.

For example if clustering algorithm is applied and the visitor is classified to one of the clustering groups, at the next step, the engaging module 140 in FIG. 1 may retrieve predefined rules for the received classification from rules database 155 in FIG. 1 and replacement content maybe selected by the rules.

The usage of predefined rules is optional and the content to be displayed can be directly selected based on content scoring or the content items probability tree, or according to content items clustering which is based on tracking and classifying content usage according to multiple attributes relating to the visitor which consumed the content, such as clicks, visits, geo location, industry, organization size or revenue or search terms. Based on the content items clustering a distance metric is generated for providing relevant recommendation.

According to some embodiments of the present invention, the owners of the website may update the predefined rules and content to be updated in relation to the respective group of visitors and their current navigation path.

This process of changing or adding information to existing websites, does not require receiving or changing the code of the monitored website. Accordingly to some embodiments of the present invention, the web content adjusting application 100 can be implemented easily, at any client site, not requiring any adjustments or settings to the client website.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A method for adjusting content in a webpage in a website, comprising:
   monitoring the website with a user tracking module;
   tracking a user that is visiting the monitored website with the user tracking module to identify a plurality of parameters relating to the user, including a first parameter associated with the user's navigation behavior within the monitored website and a second parameter associated with the user's usage of content within the monitored website;
   analyzing the identified parameters including selecting a statistical algorithm for each of the plurality of parameters corresponding to a type of the parameter, including selecting a first statistical algorithm to analyze the first parameter and a second statistical algorithm to analyze the second parameter, and wherein the identified parameters are analyzed in real time;
   selecting content in the webpage to be presented to the user corresponding to the statistical algorithm analysis results, wherein the selected content is selected from a plurality of content stored in a content database; and
   presenting the selected content in the webpage presented to the user, wherein the selected content is presented in a selected part of the webpage.

2. The method of claim 1, wherein the statistical algorithm is a clustering algorithm for classifying the user into one of a plurality of groups based on at least one of the identified parameters.

3. The method of claim 1, wherein the statistical algorithm is a probability algorithm for creating a probability tree based on an identification of a statistical correlation between a sequence of the user's navigation behavior and content selections on the website.

4. The method of claim 1, wherein the statistical algorithm is a nearest neighbor algorithm including applying a collaborative filtering for classifying users into neighborhood groups based on content usage parameters.

5. The method of claim 1, further comprising the step of retrieving at least one rule and the selected content from data storage.

6. The method of claim 5, wherein the at least one rule represents a website owner's prospect nurturing strategic schemes defining the selected content to be displayed to each group of website users based on at least one of the user's navigation behavior, the user's behavior pattern or the user's organization behavior pattern.

7. The method of claim 1, wherein the selected part of the webpage is selected by parsing the webpage in real time.

8. The method of claim 1, further comprising the step of, analyzing at least one of the user's actions while interacting with the website in relation to an occurrence time of the at least one of the user's actions.

9. The method of claim 1, further comprising the steps of:
generating an anonymous user profile for the tracked user by the user tracking module, the anonymous user profile including at least one of the identified parameters; and
storing the anonymous user profile corresponding to the tracked user in a profile database.

10. The method of claim 1, further comprising the step of storing the analysis of the identified parameters in a unique caching repository and enabling real time statistics and data retrieval for user engagement, wherein the analysis of the identified parameters include at least one of the following: a group clustering, a nearest neighbor group or a probability tree.

11. The method of claim 1, wherein the selected content is selected based on a content items clustering algorithm including classifying the plurality of content into groups and analyzing a plurality of attributes of each one of a plurality of users that consumed the plurality of content.

12. A method for providing user relevant content in a webpage in a website, comprising:
monitoring the website with a user tracking module;
tracking a user that is visiting the monitored website with the user tracking module including identifying a plurality of parameters relating to the user, including a first parameter associated with the user's navigation behavior within the monitored website and a second parameter associated with the user's usage of content within the monitored website;
generating an anonymous user profile for the tracked user by the user tracking module, the anonymous user profile including at least one of the identified parameters;
storing the anonymous user profile corresponding to the tracked user in a profile database;
analyzing the identified parameters including selecting a statistical algorithm for each of the plurality of parameters corresponding to a type of the parameter, including selecting a first statistical algorithm to analyze the first parameter and a second statistical algorithm to analyze the second parameter, and wherein the identified parameters are analyzed in real time by an engagement module;
selecting content in the webpage to be presented to the user corresponding to the statistical algorithm analysis results, wherein the selected content is selected from a plurality of content stored in a content database, wherein the selected content is selected by the engagement module; and
presenting the selected content in the webpage presented to the user, wherein the selected content is presented in a selected part of the webpage, and wherein the selected content is selected based on a content items clustering algorithm including classifying the plurality of content into groups and analyzing a plurality of attributes of each one of a plurality of users that consumed each one of the plurality content.

13. A system for providing adjusted content in a webpage in a website, said system comprised of:
an anonymous tracking module for monitoring a user's use of the website and identifying a plurality of parameters relating to the user, including a first parameter associated with the user's navigation through the website and a second parameter associated with the user's usage of the content of the website, and storing the user's use of the website in a behavioral database;
a profile generation module for generating a profile of the user without receiving specific user input identification information and storing the generated profile in a profile database;
an analysis module for selecting a statistical analysis algorithm for each of the plurality of parameters corresponding to a type of the parameter for analyzing the identified parameters, including selecting a first statistical algorithm to analyze the first parameter and a second statistical algorithm to analyze the second parameter; and
an engagement module for selecting content in the webpage to be presented to the user corresponding to the statistical algorithm analysis results, wherein the selected content is selected from a plurality of content stored in a content database, and presenting the selected content in the webpage presented to the user, wherein the selected content is presented in a selected part of the webpage, wherein the selected content is selected based on a content items clustering algorithm including classifying the plurality of content into groups and analyzing a plurality of attributes of each one of a plurality of users that consumed the plurality of content.

14. The system of claim 13, further comprising:
a clustering module for analyzing the identified parameters to determine a cluster of users having one or more similarities from the profile database; and
an assignment module for identifying the clustered users in the profile database, wherein the identified clustered users are stored in the profile database in a unique caching repository enabling real time statistics and data retrieval.

15. The system of claim 14, wherein the clustering module includes a nearby neighbor module for identifying users having nearby one or more similar geographic aspects.

16. The system of claim 14, wherein the clustering module includes a behavior module for identifying users having one or more similar website navigation or one or more website content usage behaviors on the website.

17. The system of claim 13, further comprising a rules database providing at least one rule for the engagement module to assist the engagement module in selecting the content.

18. The system of claim 17, wherein the at least one rule represents a website owner's prospect nurturing strategic schemes defining the selected content to be displayed to each group of website users based on at least one of the user's navigation behavior, the user's behavior pattern or the user's organization behavior pattern.

19. The system of claim 17, wherein the at least one rule can be updated by the website owner without changing the monitored website.

* * * * *